(12) United States Patent
Roberts et al.

(10) Patent No.: US 12,397,516 B2
(45) Date of Patent: Aug. 26, 2025

(54) METHOD FOR REPAIRING COMPOSITE COMPONENTS USING A SUPPORT MEMBER

(71) Applicant: General Electric Company, Schenectady, NY (US)

(72) Inventors: Herbert Chidsey Roberts, Middletown, OH (US); Theodore Robert Grossman, Cincinnati, OH (US)

(73) Assignee: General Electric Company, Evendale, OH (US)

( * ) Notice: Subject to any disclaimer, the term of this patent is extended or adjusted under 35 U.S.C. 154(b) by 773 days.

(21) Appl. No.: 17/113,257

(22) Filed: Dec. 7, 2020

(65) Prior Publication Data

US 2022/0176658 A1 Jun. 9, 2022

(51) Int. Cl.
*B29C 73/10* (2006.01)
*B29L 31/00* (2006.01)
*B29L 31/30* (2006.01)

(52) U.S. Cl.
CPC ....... *B29C 73/10* (2013.01); *B29L 2031/3076* (2013.01); *B29L 2031/7504* (2013.01)

(58) Field of Classification Search
CPC ..................................................... B29C 73/10
See application file for complete search history.

(56) References Cited

U.S. PATENT DOCUMENTS

| 4,916,880 A | * | 4/1990 | Westerman, Jr. | ....... B29C 73/04 29/402.09 |
| 5,448,041 A | * | 9/1995 | Benoit | ..................... C03B 23/20 219/638 |
| 5,868,886 A | * | 2/1999 | Alston | ...................... B64F 5/40 156/92 |
| 5,876,540 A | | 3/1999 | Pannell | |

(Continued)

FOREIGN PATENT DOCUMENTS

| DE | 102009028864 A1 | * | 3/2011 | ........... B29C 65/564 |
| DE | 102010053574 A1 | * | 6/2012 | ............. B29C 73/10 |

(Continued)

OTHER PUBLICATIONS

Machine Translation, Benthien Hermann et al., DE-102010053574-A1, Method for repairing an aircraft structural component, 2012, obtained from Espacenet.com, (Year: 2012).*

(Continued)

*Primary Examiner* — Nicholas R Krasnow
(74) *Attorney, Agent, or Firm* — Dority & Manning, P.A.

(57) ABSTRACT

A method for repairing composite components includes positioning one or more repair fiber plies relative to a repair interface of a composite component such that a butt joint is formed at the repair interface between the one or more repair fiber plies and the composite component. Furthermore, the method includes forming a cavity within the composite component such that the cavity extends through the repair interface. Additionally, the method includes installing a support member within the cavity. In this respect, the (Continued)

support member extends across the butt joint such that a first portion of the support member is positioned within the composite component and a second portion of the support member is positioned within the one or more repair fiber plies.

20 Claims, 6 Drawing Sheets

(56) References Cited

U.S. PATENT DOCUMENTS

| | | | | |
|---|---|---|---|---|
| 5,928,448 | A | * | 7/1999 | Daws ................... B23P 6/00 156/92 |
| 5,958,166 | A | | 9/1999 | Walters et al. |
| 7,419,556 | B2 | | 9/2008 | Holland |
| 8,540,909 | B2 | | 9/2013 | Dan-Jumbo et al. |
| 8,545,650 | B2 | | 10/2013 | Evens et al. |
| 8,844,108 | B2 | | 9/2014 | Miller et al. |
| 9,382,017 | B2 | | 7/2016 | Benthien et al. |
| 9,387,636 | B2 | | 7/2016 | Takagi et al. |
| 9,434,139 | B2 | | 9/2016 | Dan-Jumbo |
| 9,522,512 | B2 | | 12/2016 | Georgeson et al. |
| 9,993,983 | B2 | | 6/2018 | Nishimura |
| 2007/0289692 | A1 | * | 12/2007 | Bogue ................... B29C 73/10 156/98 |
| 2008/0233346 | A1 | * | 9/2008 | Bogue ................... B29C 73/10 428/116 |
| 2008/0263844 | A1 | * | 10/2008 | Stadtlander ............... B64F 5/40 29/402.09 |
| 2011/0318562 | A1 | * | 12/2011 | Dry ..................... C04B 28/02 428/221 |
| 2012/0301702 | A1 | * | 11/2012 | Nishimura ............. B29C 73/04 29/402.09 |
| 2016/0137316 | A1 | | 5/2016 | Shigetomi et al. |
| 2017/0089324 | A1 | | 3/2017 | Sanz Pascual |
| 2019/0360346 | A1 | | 11/2019 | Underwood et al. |

FOREIGN PATENT DOCUMENTS

| | | |
|---|---|---|
| WO | WO 96/15899 A1 | 5/1996 |
| WO | WO-2017081456 A1 * | 5/2017 |

OTHER PUBLICATIONS

Machine Translation, Ricardo, DE-102009028864-A1, Transport container has container walls that are made of hard foam, where container walls have breakdown in form of air gap with air gap surfaces opposite to each other, 2011, Espacenet.com. (Year: 2011).*
https://www.aerospacemanufacturinganddesign.com/article/amd0313-repair-structural-composite-parts/ "HOKE" (Year: 2013).*

* cited by examiner

METHOD FOR REPAIRING COMPOSITE COMPONENTS USING A SUPPORT MEMBER

FIELD

The present disclosure generally pertains to methods for repairing components and, more specifically, to methods for securing new composite material to an existing composite component that is worn or damaged.

BACKGROUND

In recent years, the use of non-traditional high temperature materials, such as ceramic matrix composite (CMC) materials, in gas turbine engines has grown dramatically. Specifically, there is strong interest in replacing metal alloy components within the combustion and turbine sections of a gas turbine engine with CMC components. CMC materials can withstand higher operating temperatures than metal alloys. Higher operating temperatures, in turn, increase the efficiency of the gas turbine engine. Moreover, CMC components require less cooling than metallic components. Additionally, CMC materials are lighter than metallic components and may reduce the structural demands on the engine.

However, gas turbine components formed from CMC materials can be quite expensive. In this respect, when a CMC gas turbine component becomes worn or damaged, it may be desirable to repair, rather than replace, the component. As such, methods of repairing CMC components have been developed. Specifically, the worn or damaged portion(s) of a CMC component may be removed and replaced with new CMC material. In such methods, the new CMC material is typically joined to the existing component via a scarf joint. However, when repairing the edges of certain components (e.g., blades), there is not enough material present (e.g., the edge is too thin) to form a scarf joint.

Accordingly, an improved method for repairing composite components would be welcomed in the technology.

BRIEF DESCRIPTION

Aspects and advantages of the invention will be set forth in part in the following description, or may be obvious from the description, or may be learned through practice of the invention.

In one aspect, the present subject matter is directed to a method for repairing composite components. The method includes positioning one or more repair fiber plies relative to a repair interface of a composite component such that a butt joint is formed at the repair interface between the one or more repair fiber plies and the composite component. Furthermore, the method includes forming a cavity within the composite component such that the cavity extends through the repair interface. In addition, the method includes installing a support member within the cavity. In this respect, the support member extends across the butt joint such that a first portion of the support member is positioned within the composite component and a second portion of the support member is positioned within the one or more repair fiber plies.

In another aspect, the present subject matter is directed to a method for repairing a composite turbomachine component. The method includes preparing a repair interface of a composite turbomachine component by removing worn or damaged composite material. Additionally, the method includes positioning one or more repair fiber plies at the repair interface in a transverse orientation relative to original fiber plies forming the composite turbomachine component such that a butt joint is formed at the repair interface between the one or more repair fiber plies and the composite turbomachine component. Moreover, the method includes forming a cavity within the composite turbomachine component such that the cavity extends through the repair interface. Furthermore, the method includes installing a support member within the cavity. In this respect, the support member extends across the butt joint such that a first portion of the support member is positioned within the composite turbomachine component and a second portion of the support member is positioned within the one or more repair fiber plies.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present invention.

DETAILED DESCRIPTION

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

As used herein, the terms "first", "second", and "third" may be used interchangeably to distinguish one component from another and are not intended to signify location or importance of the individual components.

Furthermore, the terms "upstream" and "downstream" refer to the relative direction with respect to fluid flow in a fluid pathway. For example, "upstream" refers to the direction from which the fluid flows, and "downstream" refers to the direction to which the fluid flows.

Additionally, the terms "low," "high," or their respective comparative degrees (e.g., lower, higher, where applicable) each refer to relative speeds within an engine, unless otherwise specified. For example, a "low-pressure turbine" operates at a pressure generally lower than a "high-pressure turbine." Alternatively, unless otherwise specified, the aforementioned terms may be understood in their superlative degree. For example, a "low-pressure turbine" may refer to the lowest maximum pressure turbine within a turbine section, and a "high-pressure turbine" may refer to the highest maximum pressure turbine within the turbine section.

In general, the present subject matter is directed to a method for repairing composite components. In several embodiments, the disclosed method may be used to repair various turbomachine components, such as ceramic matrix composite (CMC) gas turbine engine blades, vanes, shroud blocks, liners, and/or the like. More specifically, during operation, a composite component may become worn or damaged. For example, in certain instances, the damaged portion of the composite component may even break off otherwise become separated from the remainder of the composite component. As such, in accordance with the disclosed method, new composite material is formed in place of the worn/damaged portion of the composite component.

The new composite material is joined to the composite component via a butt joint and supported relative thereto via one or more support members, such as a pin(s) or a plate(s). Specifically, in one embodiment, repair fiber plies are positioned relative to a repair interface of the composite component such that a butt joint is formed at the repair interface between the repair fiber plies and the component. Thereafter, one or more cavities are formed within the repair fiber plies and the component such that the cavity(ies) extends through the repair interface. A support member(s) is then installed within the cavity(ies). In another embodiment, one or more cavities are formed within the composite component such that the cavity(ies) extends through the repair interface. A support member is then installed within each cavity. Thereafter, repair fiber plies are pressed over the support member(s), thereby positioning the plies relative to a repair interface such that a butt joint is formed. Regardless of whether positioning the repair fiber plies occurs before or after installing the support member(s), the result is that each support member extends across the butt joint such that a first portion of each support member is positioned within the composite component and a second portion of each support member is positioned within the repair fiber plies.

The use of the support member(s) and the butt joint provide one or more technical advantages. More specifically, as mentioned above, the edges of certain composite components (e.g., turbine blades) do not have enough material to form a scarf joint with the repair fiber plies. In this respect, the disclosed method forms a butt joint between the fiber plies of the composite component and the repair fiber plies, which requires less material than a scarf joint. However, an unsupported butt joint is weak and typically unable to meet the operational requirements of the component. In this respect, the support member(s), such as the pin(s) or the plate(s), support the butt joint between the fiber plies of the component and the repair fiber plies. As such, the support member(s) strengthen the butt joint such that the butt joint is strong enough to support the operational loads of the component.

Figure 1:
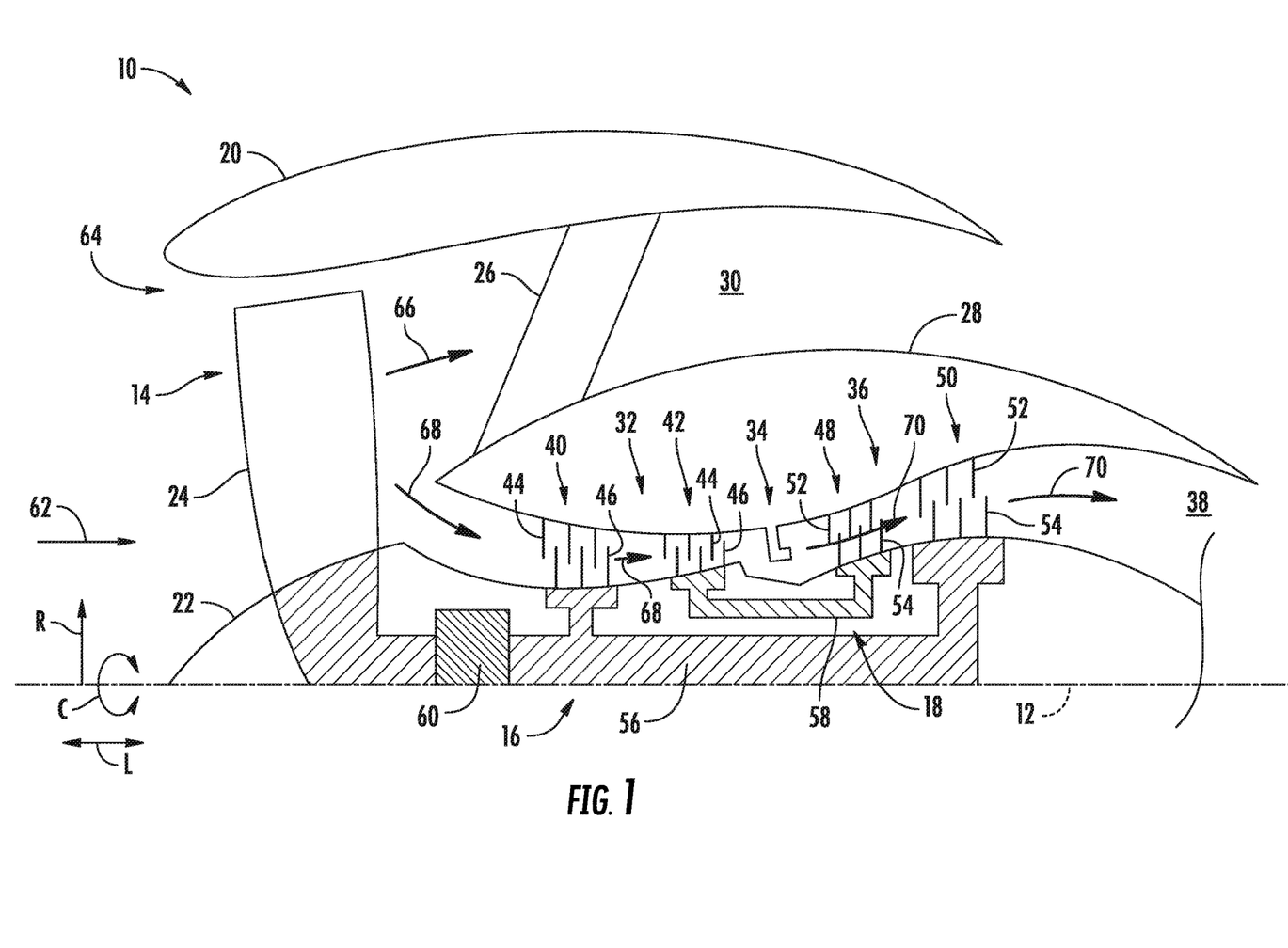
FIG. 1 is a schematic cross-sectional view of one embodiment of a gas turbine engine.

Referring now to the drawings, FIG. 1 is a schematic cross-sectional view of one embodiment of a gas turbine engine 10. In the illustrated embodiment, the engine 10 is configured as a high-bypass turbofan engine. However, in alternative embodiments, the engine 10 may be configured as a propfan engine, a turbojet engine, a turboprop engine, a turboshaft gas turbine engine, or any other suitable type of gas turbine engine.

As shown in FIG. 1, the engine 10 defines a longitudinal direction L, a radial direction R, and a circumferential direction C. In general, the longitudinal direction L extends parallel to an axial centerline 12 of the engine 10, the radial direction R extends orthogonally outward from the axial centerline 12, and the circumferential direction C extends generally concentrically around the axial centerline 12.

In general, the engine 10 includes a fan 14, a low-pressure (LP) spool 16, and a high pressure (HP) spool 18 at least partially encased by an annular nacelle 20. More specifically, the fan 14 may include a fan rotor 22 and a plurality of fan blades 24 (one is shown) coupled to the fan rotor 22.

In this respect, the fan blades 24 are spaced apart from each other along the circumferential direction C and extend outward from the fan rotor 22 along the radial direction R. Moreover, the LP and HP spools 16, 18 are positioned downstream from the fan 14 along the axial centerline 12 (i.e., in the longitudinal direction L). As shown, the LP spool 16 is rotatably coupled to the fan rotor 22, thereby permitting the LP spool 16 to rotate the fan 14. Additionally, a plurality of outlet guide vanes or struts 26 spaced apart from each other in the circumferential direction C extend between an outer casing 28 surrounding the LP and HP spools 16, 18 and the nacelle 20 along the radial direction R. As such, the struts 26 support the nacelle 20 relative to the outer casing 28 such that the outer casing 28 and the nacelle 20 define a bypass airflow passage 30 positioned therebetween.

The outer casing 28 generally surrounds or encases, in serial flow order, a compressor section 32, a combustion section 34, a turbine section 36, and an exhaust section 38. For example, in some embodiments, the compressor section 32 may include a low-pressure (LP) compressor 40 of the LP spool 16 and a high-pressure (HP) compressor 42 of the HP spool 18 positioned downstream from the LP compressor 40 along the axial centerline 12. Each compressor 40, 42 may, in turn, include one or more rows of stator vanes 44 interdigitated with one or more rows of compressor rotor blades 46. Moreover, in some embodiments, the turbine section 36 includes a high-pressure (HP) turbine 48 of the HP spool 18 and a low-pressure (LP) turbine 50 of the LP spool 16 positioned downstream from the HP turbine 48 along the axial centerline 12. Each turbine 48, 50 may, in turn, include one or more rows of stator vanes 52 interdigitated with one or more rows of turbine rotor blades 54.

Additionally, the LP spool 16 includes the low-pressure (LP) shaft 56 and the HP spool 18 includes a high pressure (HP) shaft 58 positioned concentrically around the LP shaft 56. In such embodiments, the HP shaft 58 rotatably couples the rotor blades 54 of the HP turbine 48 and the rotor blades 46 of the HP compressor 42 such that rotation of the HP turbine rotor blades 54 rotatably drives HP compressor rotor blades 46. As shown, the LP shaft 56 is directly coupled to the rotor blades 54 of the LP turbine 50 and the rotor blades 46 of the LP compressor 40. Furthermore, the LP shaft 56 is coupled to the fan 14 via a gearbox 60. In this respect, the rotation of the LP turbine rotor blades 54 rotatably drives the LP compressor rotor blades 46 and the fan blades 24.

In several embodiments, the engine 10 may generate thrust to propel an aircraft. More specifically, during operation, air (indicated by arrow 62) enters an inlet portion 64 of the engine 10. The fan 14 supplies a first portion (indicated by arrow 66) of the air 62 to the bypass airflow passage 30 and a second portion (indicated by arrow 68) of the air 62 to the compressor section 32. The second portion 68 of the air 62 first flows through the LP compressor 40 in which the rotor blades 46 therein progressively compress the second portion 68 of the air 62. Next, the second portion 68 of the air 62 flows through the HP compressor 42 in which the rotor blades 46 therein continue progressively compressing the second portion 68 of the air 62. The compressed second portion 68 of the air 62 is subsequently delivered to the combustion section 34. In the combustion section 34, the second portion 68 of the air 62 mixes with fuel and burns to generate high-temperature and high-pressure combustion gases 70. Thereafter, the combustion gases 70 flow through the HP turbine 48 which the HP turbine rotor blades 54 extract a first portion of kinetic and/or thermal energy therefrom. This energy extraction rotates the HP shaft 58, thereby driving the HP compressor 42. The combustion gases 70 then flow through the LP turbine 50 in which the LP turbine rotor blades 54 extract a second portion of kinetic and/or thermal energy therefrom. This energy extraction rotates the LP shaft 56, thereby driving the LP compressor 40 and the fan 14 via the gearbox 60. The combustion gases 70 then exit the engine 10 through the exhaust section 38.

Figure 2:
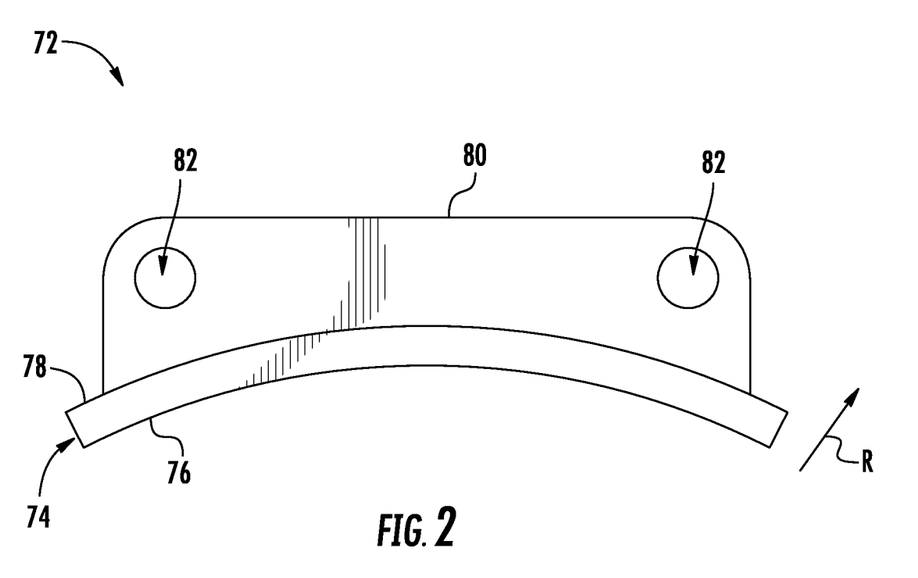
FIG. 2 is a side view of one embodiment of a shroud block of a gas turbine engine.

FIG. 2 is a side view of one embodiment of a shroud block 72 of the gas turbine engine 10. In general, several shroud blocks 72 are circumferentially arranged to form a shroud (not shown) enclosing or otherwise surrounding one of the rows of rotor blades 46 in the compressor section 32 or one of the rows of rotor blades 54 in the turbine section 36. As shown, the shroud block 72 includes an annular wall 74 extending between an inner surface 76 and an outer surface 78 in the radial direction R. The inner surface 76 is, in turn, positioned in close proximity to the tips of the corresponding blades 46, 54 to minimize the leakage of the air/combustion gases 68/70 past the blades 46, 54. Furthermore, the shroud 72 includes a pair of mounting rails 80 (one is shown). The rails 80 are spaced apart from each other in the longitudinal direction L and extend outward from the outer surface 78 of the annular wall 74 in the radial direction R. Moreover, each rail 80 defines a pair of mounting holes 82 for coupling the shroud block 72 to the outer casing 28 of the engine 10. However, in alternative embodiments, the shroud block 72 may have any other suitable configuration.

Additionally, one or more the components of the gas turbine engine 10 may be formed of a composite material, such as ceramic matrix composite (CMC) material or polymer matrix composite (PMC) material. For example, in several embodiments, the compressor vanes 44, the compressor blades 46, the turbine vanes 52, the turbine blades 54, and shroud blocks 72 may be formed from CMC materials and the fan blades 24 may be formed from PMC materials. However, in alternative embodiments, any other suitable components of the engine 10 may be formed by composite materials.

The configuration of the gas turbine engine 10 described above and shown in FIGS. 1 and 2 is provided only to place the present subject matter in an exemplary field of use. Thus, the present subject matter may be readily adaptable to any manner of gas turbine engine configuration, including other types of aviation-based gas turbine engines, marine-based gas turbine engines, and/or land-based/industrial gas turbine engines.

Figure 3:
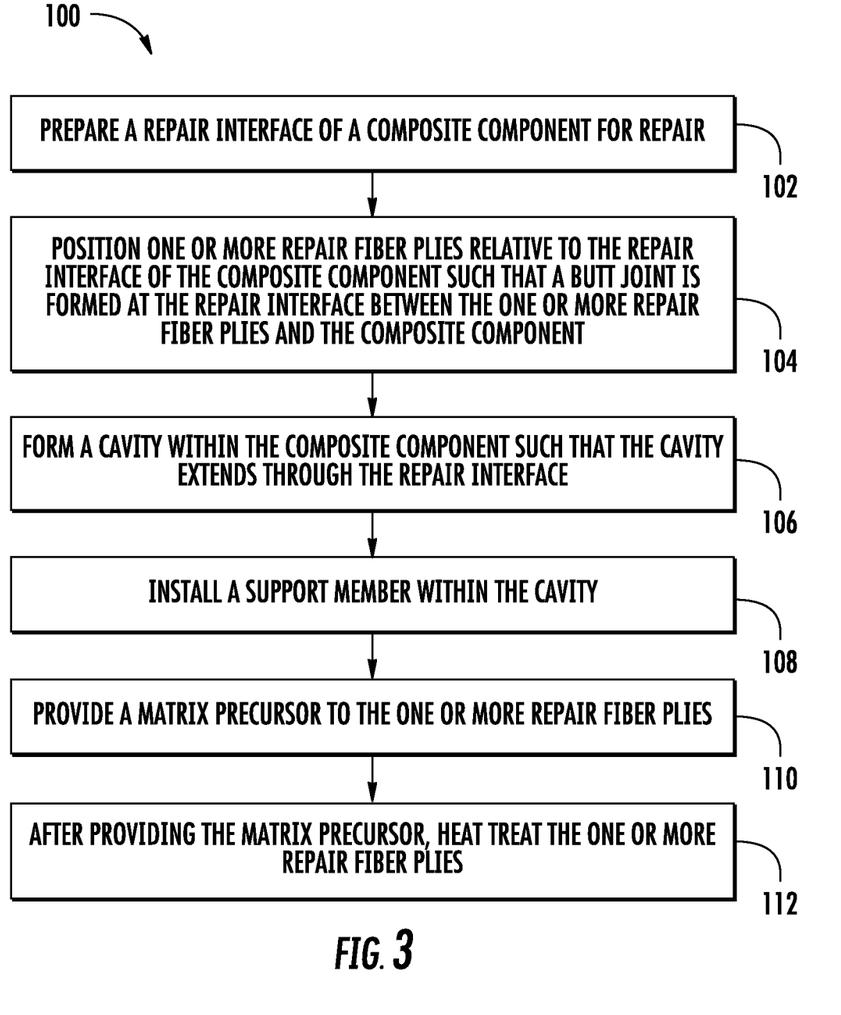
FIG. 3 is a flow diagram of one embodiment of a method for repairing composite components.

FIG. 3 is a flow diagram of one embodiment of a method 100 for repairing composite components. Although FIG. 3 depicts steps performed in a particular order, the disclosed methods are not limited to any particular order or arrangement. As such, the various steps of the disclosed methods can be omitted, rearranged, combined, and/or adapted in various ways without deviating from the scope of the present disclosure.

In general, the various steps of the method 100 will be described below in the context of repairing a composite component 200 as schematically depicted in FIGS. 4-11. For example, as will be described below, the composite component 200 may correspond to a composite component of the gas turbine engine 10. However, in alternative embodiments, the composite component 200 may correspond to any other suitable composite component.

Figure 4:
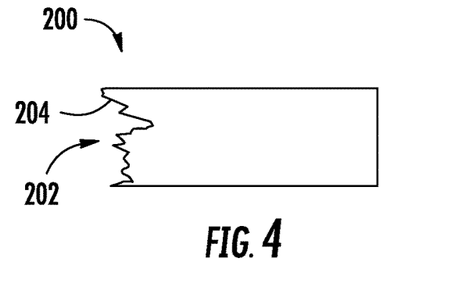
FIG. 4 is a top view of one embodiment of a composite component, particularly illustrating the component prior to repair.

FIG. 4 is a perspective view of one embodiment of the composite component 200. As shown, the composite component 200 includes a repair region 202. In general, the repair region 202 corresponds to a portion of the component 200 that will be repaired in accordance with the methods disclosed herein. For example, in certain instances, a damaged/worn portion of the component 200 may break off or separate from the remainder of the component 200. In such instances, at least a portion of the repair region 202 may be devoid of composite material prior to repair. Furthermore, as will be described below, it may be necessary to remove additional material from the repair region 200, such as when the repair region 202 has an irregular surface 204, to facilitate repair. As such, the repair region 202 is portion of the component 200 that will be replaced with new composite material. Although the component 200 shown in FIG. 1 only includes one repair region 202, the component 200 may, in other embodiments, include any other suitable number of repair regions 202.

Moreover, the composite component 200 may be formed from any suitable composite material. For example, the composite material may be selected from the group consisting of, but not limited to, a ceramic matrix composite (CMC), a polymer matrix composite (PMC), a metal matrix composite (MMC), or a combination thereof. Suitable examples of matrix material for a CMC include, but are not limited to, silicon carbide, aluminum-oxide, silicon oxide, and combinations thereof. Suitable examples of matrix material for a PMC include, but are not limited to, epoxy-based matrices, polyester-based matrices, and combinations thereof. Suitable examples of a matrix material for a MMC include, but are not limited to, aluminum, titanium, and combination thereof. For example, a MMC may be formed from powder metals such as, but not limited to, aluminum powder or titanium powder capable of being melted into a continuous molten liquid metal which can encapsulate fibers present in the assembly, before being cooled into a solid ingot with incased fibers. The resulting MMC is a metal article with increased stiffness, and the metal portion (matrix) is the primary load carrying element.

Figure 5:
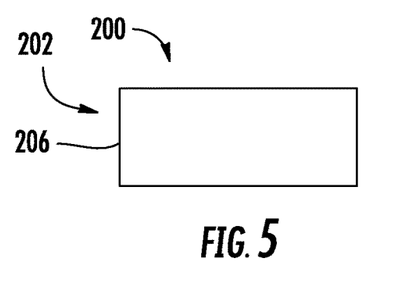
FIG. 5 is top view of the composite component shown in FIG. 4, particularly illustrating a repair interface of the component after preparation for repair.

Referring again to FIG. 3, at (102), the method 100 includes preparing a repair interface of a composite component for repair. Specifically, in several embodiments, at (102), the worn or damaged material within the repair region 202 that has not already broken off or separated from a remainder of the composite component 200 may be removed from the component 200 via machining, grinding, cutting, and/or the like. For example, in certain instances, as shown in FIG. 4, the repair region 202 may include an irregular surface 204 unsuitable for joining to the new composite material. In such instances, at (102), material from the component 200 may be removed to form a suitable repair interface 206. The repair interface 206 is, in turn, the surface of the component 200 to which the new composite material will be joined. As shown in FIG. 5, upon completion of (102), the worn/damaged material of the repair region 202 has been removed and the repair interface 206 has been formed. In an embodiment, the repair interface 206 forms a regular surface, i.e., a smooth or even surface, such as a planar surface.

Figure 6:
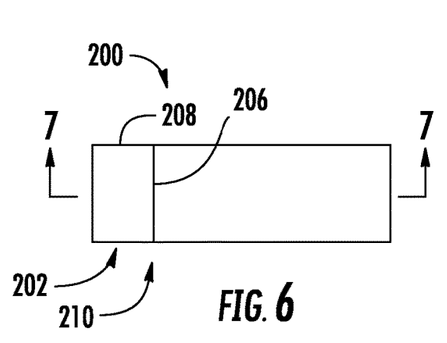
FIG. 6 is a top view of the composite component shown in FIGS. 4 and 5, particularly illustrating repair fiber plies positioned relative to the repair interface of the component such that a butt joint is formed.
Figure 7:
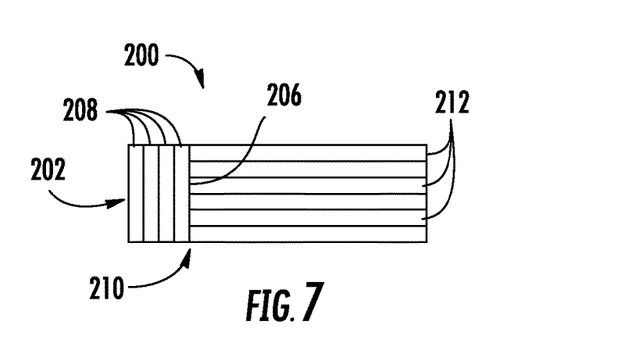
FIG. 7 is a cross-sectional view of the composite component shown in FIGS. 4-6 taken about line 7-7 in FIG. 6, particularly illustrating the repair fiber plies oriented transversely relative to the fiber plies of the component.

Additionally, as shown in FIG. 3, after preparing the repair interface, at (104), the method 100 includes positioning one or more repair fiber plies relative to the repair interface of the composite component such that a butt joint is formed at the repair interface between the one or more repair fiber plies and the composite component. For example, as shown in FIGS. 6 and 7, repair fiber plies 208 are positioned relative to the component 200 such that a butt joint 210 is formed at the repair interface 206 between the repair fiber plies 208 and the component 200. In this respect, the repair fiber plies 208 are in contact with the repair interface 206 and occupy the space where the worn/damaged material was originally present. As will be described below, a matrix precursor material is provided (e.g., via infiltration or infusion) such that new composite material is formed in the repair region 202, thereby repairing the component 200. In this respect, the repair fiber plies 208 correspond to the fiber material of the composite material from which the component 200 is formed.

As specifically shown in FIG. 7, at (104), in several embodiments, the repair fiber plies 208 are oriented transversely relative to the fiber plies 212 of the composite component 200. Such a transverse orientation strengthens the butt joint 206, thereby increasing the operational loads that the repaired component 200 can withstand. However, in alternative embodiments, the repair fiber plies 208 may be oriented in any other suitable manner relative to the fiber plies 212 of the composite component 200.

Figure 8:
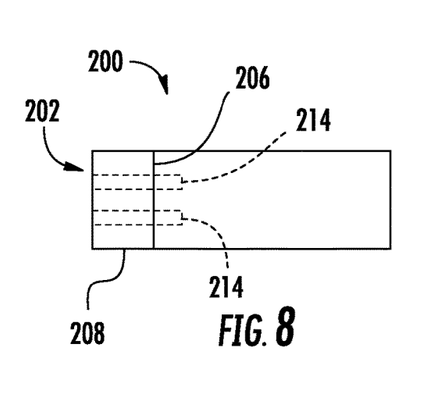
FIG. 8 is a top view of the composite component shown in FIGS. 4-7, particularly illustrating holes formed within the repair fiber plies and the composite component.
Figure 9:
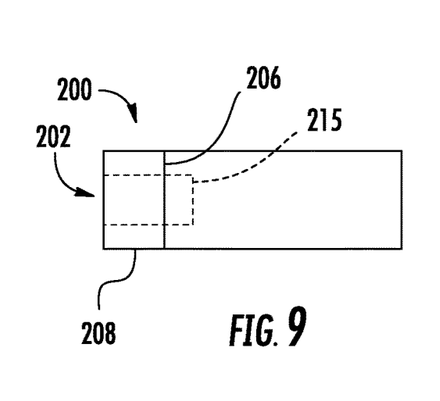
FIG. 9 is a top view of the composite component shown in FIGS. 4-7, particularly illustrating a slot formed within the repair fiber plies and the composite component.

Furthermore, as shown in FIG. 3, at (106), after positioning the repair ply(ies), the method 100 includes forming a cavity within the composite component such that the cavity extends through the repair interface. For example, as shown in FIG. 8, in one embodiment, after positioning the repair fiber plies 208, a pair of holes 214 is formed (e.g., via drilling) within the repair fiber plies 208 and the composite component 200 such that the holes 214 extend through the repair interface 206. In this respect, a first portion of each hole 214 is positioned within the composite component 200 and a second portion of each hole 214 is positioned within the repair region 202. In another embodiment, as shown in FIG. 9, after positioning the repair fiber plies 208, a slot 215 is formed (e.g., via milling) within the repair fiber plies 208 and the composite component 200 such that the slot 215 extends through the repair interface 206. In this respect, a first portion of the slot 215 is positioned within the composite component 200 and a second portion of the slot 215 is positioned within the repair region 202. However, in alternative embodiments, any other suitable number and/or type of cavity may be formed at (106).

Figure 10:
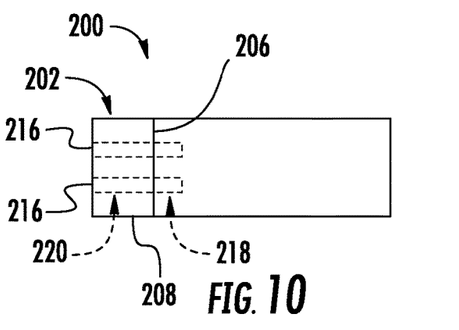
FIG. 10 is a top view of the composite component shown in FIGS. 4-8, particularly illustrating a pin positioned within one of the holes formed within the repair fiber plies and the composite component.
Figure 11:
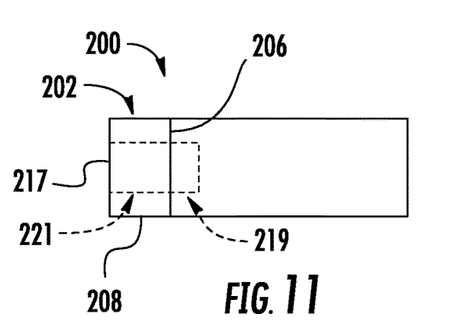
FIG. 11 is a top view of the composite component shown in FIGS. 4-7 and 9, particularly illustrating a key or plate positioned within the slot formed within the repair fiber plies and the composite component.

Moreover, as shown in FIG. 3, at (108), the method 100 includes installing a support member within the cavity. Specifically, as shown in FIG. 10, in one embodiment, a pin 216 is installed within each hole 214 such that a first portion 218 of each pin 216 is positioned within the composite component 200 and a second portion 220 of each pin 216 is positioned within the repair fiber plies 208. As shown in FIG. 11, in another embodiment, a key or plate 217 is installed within the slot 215 such that a first portion 219 of the plate 217 is positioned within the composite component 200 and a second portion 221 of the plate 217 is positioned within the repair fiber plies 208. As will be described below, the support member(s) (e.g., the pins 216 or the plate 217) support the repair fiber plies 208 relative to the component 200, thereby strengthening the butt joint 210. The support member(s) may be formed from any suitable material, such as a metallic material or a composite material. However, in alternative embodiments, the support member(s) may be configured as any other suitable device or component capable of supporting the repair fiber plies 208 and the component 200 relative to each other in a butt joint connection.

In addition, as shown in FIG. 3, after installing the support member, at (108), the method 100 includes providing a matrix precursor to the one or more repair fiber plies. More specifically, after the repair fiber plies 208 have been positioned and the pins 216 have been installed, a matrix precursor is supplied or otherwise provided to the repair fiber plies 208. For example, in one embodiment, the composite component 200 is formed from a ceramic matrix composite (CMC) material. In such an embodiment, at (108), the repair fiber plies 208 are infiltrated (e.g., via melt infiltration) with a suitable infiltrant (e.g., silicon). In another embodiment, the composite component 200 is formed from a polymeric matrix composite (PMC) material. In such an embodiment, (at 108), the repair fiber plies 208 are infused (e.g., via vacuum infiltration) with a suitable resin. However, in alternative embodiments, the matrix precursor may be provided to the repair fiber plies 208 in any other suitable manner.

In addition, at (112), after providing the matrix material, the method 100 includes heat treating the one or more repair fiber plies. For example, after infiltrating or infusing the repair fiber plies 208, the plies 208 are heat treated (e.g., in a suitable furnace). After heat treatment at (112), the support member(s) (e.g., the pins 216 or the plate 217) remain in the composite component 200. In this respect, the support member(s) support the butt joint 210 between the fiber plies 212 of the component 200 and the repair fiber plies 208. As such, the support member(s) strengthen the butt joint 210 such that the butt joint 210 is strong enough to support the operational loads of the component 200.

Figure 12:
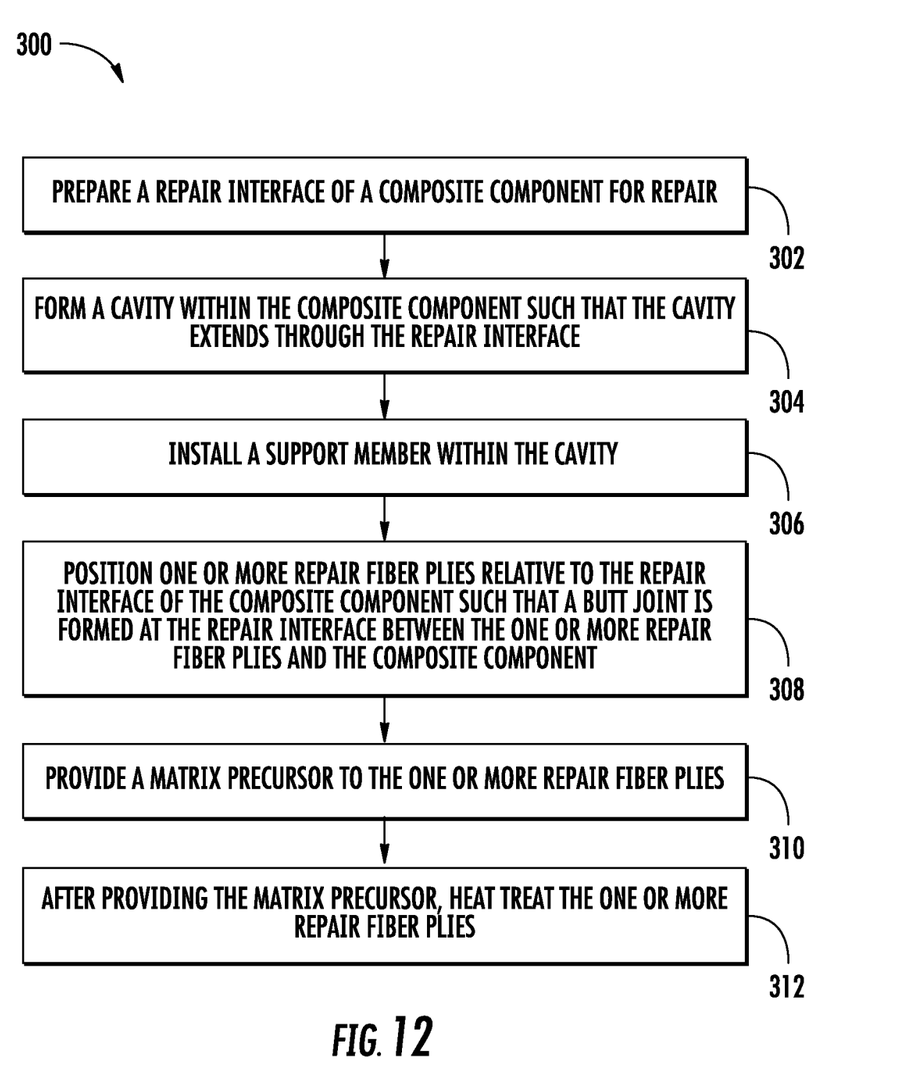
FIG. 12 is a flow diagram of another embodiment of a method for repairing composite components.

FIG. 12 is a flow diagram of another embodiment of a method 300 for repairing composite components. As will be described below, the steps of the embodiment of the method 300 shown in FIG. 12 are similar to the steps of the embodiment of the method 100 shown in FIG. 3. However, some of the steps of the embodiment of the method 300 shown in FIG. 12 are performed in a different order than the embodiment of the method 100 shown in FIG. 3. In general, the various steps of the method 300 will be described below in the context of repairing a composite component 200 as schematically depicted in FIGS. 13-18 where like reference numerals are used to refer to like features depicted in reference to component 200 of FIGS. 4-11.

As shown in FIG. 12, at (302), the method 300 may include preparing a repair interface in the repair region 202 of a composite component 200 for repair as described above in reference to (102).

Figure 13:
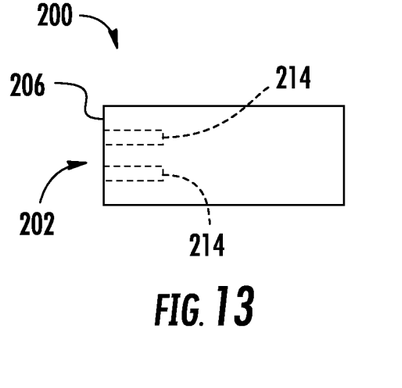
FIG. 13 is a top view of the composite component shown in FIGS. 4 and 5, particularly illustrating holes formed within the composite component.
Figure 14:
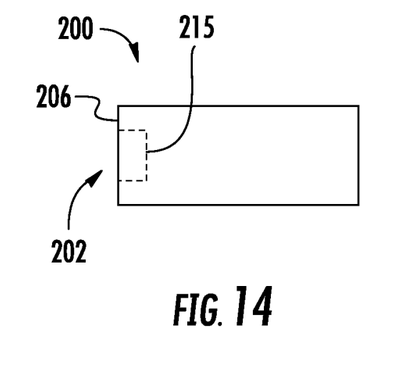
FIG. 14 is a top view of the composite component shown in FIGS. 4 and 5, particularly illustrating a slot formed within the composite component.

Additionally, as shown in FIG. 12, after preparing the repair interface, at (304), the method 300 includes forming a cavity within the composite component such that the cavity extends through the repair interface. For example, as shown in FIG. 13, in one embodiment, a pair of holes 214 is formed (e.g., via drilling) within the composite component 200 such that the holes 214 extend through the repair interface 206. As shown in FIG. 14, in one embodiment, a slot 215 is formed (e.g., via milling) within the composite component 200 such that the slot 215 extends through the repair interface 206. However, in alternative embodiments, any other suitable number and/or type of cavity may be formed at (304).

Figure 15:
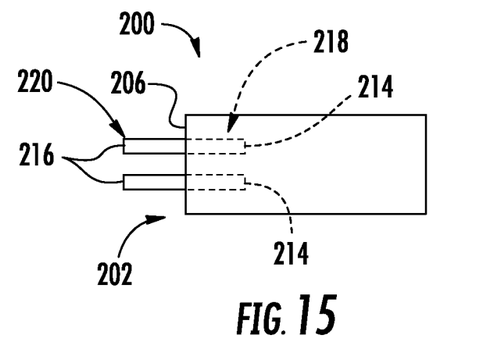
FIG. 15 is a top view of the composite component shown in FIGS. 4, 5, and 13, particularly illustrating pins installed within the formed holes.
Figure 16:
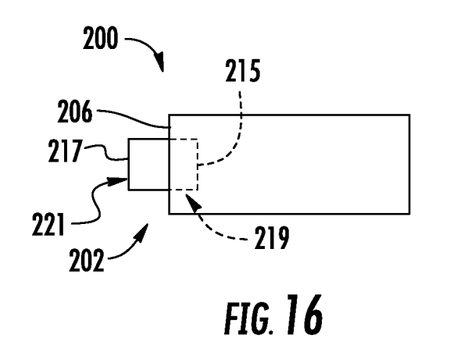
FIG. 16 is a top view of the composite component shown in FIGS. 4, 5, and 14, particularly illustrating a plate installed within the formed holes.

Further, as shown in FIG. 12, at (306), the method 300 includes installing a support member within the cavity. Specifically, as shown in FIG. 15, in one embodiment, pins 216 are installed within the holes 214 such that a first portion 218 of each pin 216 is positioned within the composite component 200 and a second portion 220 of each pin 216 extends outward from the repair interface 206. As shown in FIG. 16, in another embodiment, a key or plate 217 is installed within the slot 215 such that a first portion 219 of the plate 217 is positioned within the composite component 200 and a second portion 221 of the plate 217 extends outward from the repair interface 206. However, in alternative embodiments, the support member(s) may be configured as any other suitable device or component capable of supporting the repair fiber plies 208 and the component 200 relative to each other in a butt joint connection.

Figure 17:
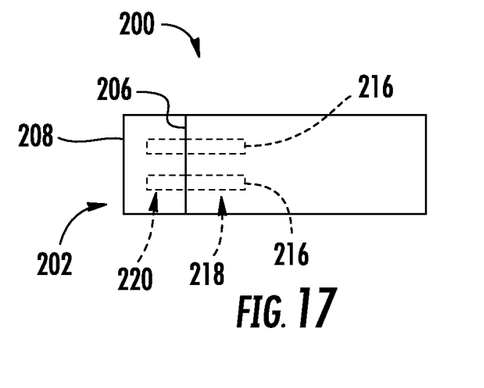
FIG. 17 is a top view of the composite component shown in FIGS. 4, 5, 13, and 15, particularly illustrating repair fiber plies positioned relative to the repair interface of the component such that a butt joint is formed.
Figure 18:
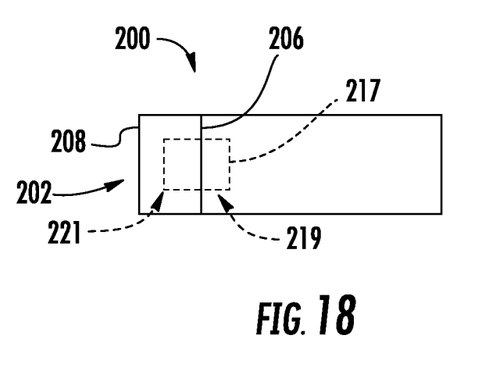
FIG. 18 is a top view of the composite component shown in FIGS. 4, 5, 14, and 16, particularly illustrating repair fiber plies positioned relative to the repair interface of the component such that a butt joint is formed.

Further, as shown in FIG. 12, after installing the pin, at (308), the method 300 includes positioning one or more repair fiber plies relative to the repair interface of the composite component such that a butt joint is formed at the repair interface between the one or more repair fiber plies and the composite component. For example, as shown in FIG. 17, in one embodiment, repair fiber plies 208 are pressed over the pins 216 such that the pins 216 pierce the repair fiber plies 208 and a butt joint 210 is formed at the repair interface 206 with the component 200. As shown in FIG. 18, in one embodiment, repair fiber plies 208 are pressed over the plate/key 217 such that the plate/key 217 pierces the repair fiber plies 208 and a butt joint 210 is formed at the repair interface 206 with the component 200. In this respect, the repair fiber plies 208 are in contact with the repair interface 206 and occupy the space where the worn/damaged material was originally present. As shown in FIG. 7, in several embodiments, the repair fiber plies 208 are oriented transversely relative to the fiber plies 212 of the composite component 200.

In addition, as shown in FIG. 12, at (310), after positioning the repair fiber ply(ies), the method 300 includes providing a matrix precursor to the one or more repair fiber plies as described above.

Further, at (312), after providing the matrix material, the method 100 includes heat treating the one or more repair fiber plies as described above.

In the various embodiments described herein, the support member(s) (e.g., the pins 216 or the plate 217) may extend completely through the one or more repair fiber plies 208 to an exterior surface of the repaired component, such as depicted in FIGS. 10 and 11. Alternatively, the support member(s) (e.g., the pins 216 or the plate 217) may extend less than completely through the one or more repair fiber plies 208 so as to be encased within a repaired portion of the composite component, such as depicted in FIGS. 17 and 18. For example, when a plurality of repair fiber plies 208 are pressed over the pins 216 or the plate 217, the pins 216 or the plate 217 may pierce only one or more but not all of the plurality of repair fiber plies 208.

The method 100 of FIG. 3 and/or the method 300 of FIG. 12 may apply to repairing composite turbomachine components. Thus, in the embodiments described above, the composite component 200 may be a composite component(s) of the engine 10. For example, in some embodiments, composite component(s) 200 correspond to a fan blade(s) 24, a compressor vane(s) 44, a compressor blade(s) 46, a turbine vane(s) 52, a turbine blade(s) 54, and/or a shroud block(s) 72 of the engine 10. However, in alternative embodiments, the composite component(s) may correspond to any suitable component(s), such as other component(s) of a turbomachine or component(s) of any other turbomachine This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

A method for repairing composite components, the method comprising: positioning one or more repair fiber plies relative to a repair interface of a composite component such that a butt joint is formed at the repair interface between the one or more repair fiber plies and the composite component; forming a cavity within the composite component such that the cavity extends through the repair interface; and installing a support member within the cavity, wherein the support member extends across the butt joint such that a first portion of the support member is positioned within the composite component and a second portion of the support member is positioned within the one or more repair fiber plies.

The method of one or more of these clauses, wherein the support member comprises a pin and the cavity comprises a hole.

The method of one or more of these clauses, wherein the support member comprises a plate and the cavity comprises a slot.

The method of one or more of these clauses, wherein positioning the one or more repair fiber plies comprises orienting the one or more repair fiber plies transversely relative to a plurality of original fiber plies forming the composite component.

The method of one or more of these clauses, wherein forming the cavity within the composite component and installing the support member within the cavity are performed before positioning the one or more repair fiber plies relative to the repair interface.

The method of one or more of these clauses, wherein positioning the one or more repair fiber plies comprises pressing the one or more repair fiber plies over the support member such that the support member pierces the one or more repair fiber plies.

The method of one or more of these clauses, wherein positioning the one or more repair fiber plies relative to the repair interface is performed before forming the cavity.

The method of one or more of these clauses, wherein forming the cavity comprises forming the cavity within the one or more repair fiber plies and the composite component such that the cavity extends through the repair interface.

The method of one or more of these clauses, further comprising: providing a matrix precursor to the one or more repair fiber plies.

The method of one or more of these clauses, wherein: the composite component is formed from a ceramic matrix composite material; and providing the matrix precursor comprises infiltrating the one or more repair fiber plies with an infiltrant.

The method of one or more of these clauses, wherein: the composite component is formed from a polymeric matrix composite material; and providing the matrix precursor comprises infusing the one or more repair fiber plies with a resin.

The method of one or more of these clauses, further comprising: after providing the matrix precursor, heat treating the one or more repair fiber plies.

The method of one or more of these clauses, wherein the support member remains in the composite component after heat treating.

The method one or more of these clauses, wherein the support member is formed from a metallic material or a composite material.

The method of one or more of these clauses, wherein the composite component is a turbomachine component.

A method for repairing a composite turbomachine component, the method comprising: preparing a repair interface of a composite turbomachine component by removing worn or damaged composite material; positioning one or more repair fiber plies at the repair interface in a transverse orientation relative to original fiber plies forming the composite turbomachine component such that a butt joint is formed at the repair interface between the one or more repair fiber plies and the composite turbomachine component; forming a cavity within the composite turbomachine component such that the cavity extends through the repair interface; and installing a support member within the cavity, wherein the support member extends across the butt joint such that a first portion of the support member is positioned within the composite turbomachine component and a second portion of the support member is positioned within the one or more repair fiber plies.

The method of one or more of these clauses, wherein forming the cavity within the composite turbomachine component and installing the support member within the cavity are performed before positioning the one or more repair fiber plies the repair interface.

The method of one or more of these clauses, wherein positioning the one or more repair fiber plies comprises pressing the one or more repair fiber plies over the support member such that the support member pierces the one or more repair fiber plies.

The method of one or more of these clauses, wherein the one or more repair fiber plies comprises a plurality of repair fiber plies, and wherein the support member pierces less than all of the plurality of repair fiber plies such that the support member is encased within a repaired portion of the composite turbomachine component.

The method of one or more of these clauses, wherein the composite turbomachine component is formed from a ceramic matrix composite material, the method further comprising: infiltrating the one or more repair fiber plies with an infiltrant; and heat treating the one or more repair fiber plies to form a repaired composite turbomachine component.

The method of one or more of these clauses, wherein positioning the one or more repair fiber plies comprises pressing the one or more repair fiber plies over the support member such that the support member pierces the one or more repair fiber plies.

What is claimed is:

1. A method for repairing composite components, the method comprising:
   removing worn or damaged composite material from a composite component to form a repair interface extending from a first side of the composite component to a second side of the composite component opposite the first side;
   positioning one or more repair fiber plies relative to the repair interface from the first side to the second side such that a butt joint is formed at the repair interface between the one or more repair fiber plies and the composite component;
   after removing the worn or damaged composite material, forming a blind hole or a blind slot within the composite component such that the blind hole or the blind slot extends through the repair interface and into the composite component; and
   installing a support member within the blind hole or the blind slot,
   wherein the support member extends across the butt joint such that a first portion of the support member is positioned within the composite component and a second portion of the support member is positioned within the one or more repair fiber plies.

2. The method of claim 1, wherein the support member comprises a pin and the blind hole or the blind slot comprises the blind hole.

3. The method of claim 1, wherein the support member comprises a plate-and the blind hole or the blind slot comprises the blind slot.

4. The method of claim 1, wherein positioning the one or more repair fiber plies comprises orienting the one or more repair fiber plies transversely relative to a plurality of original fiber plies forming the composite component.

5. The method of claim 1, wherein forming the blind hole or the blind slot within the composite component comprises installing the support member within the blind hole or the blind slot before positioning the one or more repair fiber plies relative to the repair interface; and
installing the support member comprises installing the support member within the blind hole or the blind slot before positioning the one or more repair fiber plies relative to the repair interface.

6. The method of claim 5, wherein positioning the one or more repair fiber plies comprises pressing the one or more repair fiber plies over the support member such that the support member pierces the one or more repair fiber plies.

7. The method of claim 1, wherein positioning the one or more repair fiber plies relative to the repair interface is performed before forming the blind hole or the blind slot.

8. The method of claim 7, wherein forming the blind hole or the blind slot comprises forming the blind hole or the blind slot within the one or more repair fiber plies and the composite component such that the blind hole or the blind slot extends through the repair interface.

9. The method of claim 1, further comprising:
providing a matrix precursor to the one or more repair fiber plies.

10. The method of claim 9, wherein:
the composite component is formed from a ceramic matrix composite material; and
providing the matrix precursor comprises infiltrating the one or more repair fiber plies with an infiltrant.

11. The method of claim 9, wherein:
the composite component is formed from a polymeric matrix composite material; and
providing the matrix precursor comprises infusing the one or more repair fiber plies with a resin.

12. The method of claim 9, further comprising:
after providing the matrix precursor, heat treating the one or more repair fiber plies.

13. The method of claim 12, wherein the support member remains in the composite component after heat treating.

14. The method of claim 1, wherein the support member is formed from a metallic material or a composite material.

15. The method of claim 1, wherein the composite component is a turbomachine component.

16. A method for repairing a composite turbomachine component, the method comprising:
removing worn or damaged composite material from a composite turbomachine component to form a repair interface extending from a first side of the composite turbomachine component to a second side of the composite turbomachine component opposite the first side;
positioning one or more repair fiber plies at the repair interface from the first side to the second side in a transverse orientation relative to original fiber plies forming the composite turbomachine component such that a butt joint is formed at the repair interface between the one or more repair fiber plies and the composite turbomachine component;
after the worn or damaged composite material is removed, forming a blind hole or a blind slot within the composite turbomachine component such that the blind hole or the blind slot extends through the repair interface and into the composite turbomachine component; and
installing a support member within the blind hole or the blind slot,
wherein the support member extends across the butt joint such that a first portion of the support member is positioned within the composite turbomachine component and a second portion of the support member is positioned within the one or more repair fiber plies.

17. The method of claim 16, wherein forming the blind hole or the blind slot within the composite turbomachine component and installing the support member within the blind hole or the blind slot are performed before positioning the one or more repair fiber plies the repair interface.

18. The method of claim 17, wherein positioning the one or more repair fiber plies comprises pressing the one or more repair fiber plies over the support member such that the support member pierces the one or more repair fiber plies.

19. The method of claim 18, wherein the one or more repair fiber plies comprises a plurality of repair fiber plies, and wherein the support member pierces less than all of the plurality of repair fiber plies such that the support member is encased within a repaired portion of the composite turbomachine component.

20. The method of claim 16, wherein the composite turbomachine component is formed from a ceramic matrix composite material, the method further comprising:
infiltrating the one or more repair fiber plies with an infiltrant; and
heat treating the one or more repair fiber plies to form a repaired composite turbomachine component.

* * * * *